(12) United States Patent
Voets et al.

(10) Patent No.: US 6,322,350 B1
(45) Date of Patent: *Nov. 27, 2001

(54) MOULD FOR MANUFACTURING DISC-LIKE OBJECTS

(75) Inventors: Martinus Henricus Joseph Voets, Eindhoven; Petrus Johannes Frederik Joseph Van Hout, Helmond, both of (NL)

(73) Assignee: Axxicon Moulds Eindhoven B.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,648

(22) Filed: Mar. 10, 1998

(30) Foreign Application Priority Data

Mar. 12, 1997 (NL) .................................................. 1005502

(51) Int. Cl.⁷ .......................... B29D 17/00; B29C 45/73
(52) U.S. Cl. .......................... 425/548; 249/79; 249/80; 249/135; 264/1.33; 425/552; 425/810
(58) Field of Search ................................. 425/547, 548, 425/549, 552, 810; 264/1.33, 106, 107; 249/79, 89, 134, 135

(56) References Cited

U.S. PATENT DOCUMENTS

| 4,141,531 | * | 2/1979 | Strausfeld | 425/810 |
| 4,260,360 | | 4/1981 | Holmes et al. | |
| 5,501,592 | * | 3/1996 | Kitamura | 264/107 |
| 5,783,233 | * | 7/1998 | Takahashi | 425/810 |
| 5,792,492 | * | 8/1998 | Takahashi | 425/810 |

FOREIGN PATENT DOCUMENTS

| 0276897 | 8/1988 | (EP) . |
| 1209155 | 10/1970 | (GB) . |
| 9420288 | 9/1994 | (WO) . |

OTHER PUBLICATIONS

Patent Abstracts of Japan, Publication No. 58224730; Publication Date: Dec. 27, 1983; Application Date: June 25, 1982; Application No. 57108291; Applicant: Pioneer Electronic Corp.; Inventor: Iwama Kiyonori; and Title: Temperature Adjusting Device of Mold for Injection Molding.

Patent Abstracts of Japan, Publication No. 63295474; Publication Date: Jan. 12, 1988; Application Date: May 27, 1987; Application No. 62130662; Applicant: Hotachi Metals, Ltd.; Inventor: Inoue Ryoji; and Title: Mold for Molding Plastic Disk.

Patent Abstracts of Japan, Publication No. 63035320; Publication Date: Feb. 16, 1988; Application Date: Jul. 31, 1986; Application No. 61180777; Applicant: Idemitsu Petrochem Co. Ltd.; Inventor: Takamatsu Yuji; and Title: Injection Molding Equipment.

(List continued on next page.)

Primary Examiner—Mathieu D. Vargot
(74) Attorney, Agent, or Firm—Webb Ziensenheim Logdson Orkin & Hanson, P.C.

(57) ABSTRACT

A mould for manufacturing disc-like objects including at least two mould parts which are mutually movable between a closed position in which they bound a mould cavity, which mould cavity is connected to an injection conduit for admitting heated, plasticized plastic under pressure into said mould cavity, and an opened position in which a disc-like object can be removed. The mould also has a device for removing a central portion from a disc-like object to form a central hole present therein, which device comprises a cylindrical part which is movable in axial direction in the closed situation of the mould cavity. The mould has the feature that at least one of the two mould parts is tempered only in the middle zone of the mould cavity for tempering the inflowing plastic during the inflow thereof via the pressure line and thus during the filling of the mould cavity.

20 Claims, 4 Drawing Sheets

OTHER PUBLICATIONS

Patent Abstracts of Japan, Publication No. 01159221; Publication Date: June 22, 1989; Application Date: Dec. 17, 1987, Application No. 62317603; Applicant: TDK Corp.: Inventor: Ishida Toshihiko; and Title: Molding Device for Optical Disk.

Patent Abstracts of Japan, Publication No. 01216807; Publication Date: Aug. 30, 1989; Application Date: Feb. 26, 1988; Application No. 63041864; Applicant: Toshiba Corp.; Inventor: Yokoyama Kiyoharu; and Title: Mold for Dic.

Patent Abstracts of Japan, Publication No. 05212766; Publication Date: Aug. 24, 1993; Application Date: Feb. 4, 1992; Application No. 04019760; Applicant: Mitsubishi Plastics Ind. Ltd.; Inventor: Kurosaki Norio; and Title: Mold for Molding Disk Substrate.

Patent Abstracts of Japan, Publication No. 5278088; Publiucation Date: Oct. 26, 1993; Application Date: Mar. 4, 1992; Application No. 04046947; Applicant: Sharp Corp.; Inventor: Nagaura Toshiichi; and Title: Mold for Molding Optical Disc.

Patent Abstracts of Japan, Publication No. 06008297; Publication Date: Jan. 18, 1994; Application Date: Jul. 19, 1991; Application No. 03204843; Applicant: Meiki Co. Ltd.; Inventor: Asai Ikuo; and Title: Injection Mold for Molding Disc Product.

* cited by examiner

FIG.8

MOULD FOR MANUFACTURING DISC-LIKE OBJECTS

BACKGROUND OF THE INVENTION

The invention lies in the field of manufacturing disc-like plastic objects by means of a mould. The manufacture of disc-like objects by means of a mould is known. Diverse known techniques are, among others, injection moulding, injection pressing, injection compression and coining. The invention is applicable to all of these as well as other suitable techniques.

The invention relates to a mould for manufacturing disc-like objects, which mould comprises:

at least two mould parts which are mutually movable between a closed position in which they bound a mould cavity, which mould cavity is connected to an injection conduit for admitting heated, plasticized plastic under pressure into said mould cavity, and an opened position in which a disc-like object can be removed; and removing means for removing a central portion from a disc-like object to form a central hole present therein, which removing means comprise a cylindrical part which is movable in axial direction in the closed situation of the mould cavity.

Such a mould is known generally and in many embodiments.

The disc-like objects are in particular transparent information carriers such as CDs and DVDs. For a correct scanning of the digital information arranged thereon, such information carriers must comply with very specific technical requirements. In addition to flatness and transparency, such technical requirements also include properties relating to birefringence, which must meet a required standard within close tolerances and must generally be as low as possible.

The birefringence is an optical measurement value for internal material stresses. These internal stresses are introduced during manufacture by injection moulding or injection pressing of polycarbonate substrates. They are caused by shrinkage, flow lines and/or inclusions of air or other contaminants. The stresses result in the light of the laser being additionally diffused during scanning, whereby phase differences occur when a substrate is scanned. This diffusion of light rays results in a decrease in the effective intensity of the laser beam. Thereafter, light rays are also deflected and diffusion occurs when radiation transfers from the one medium to another medium with a different density.

The wavelength of a scanning laser is roughly 780 nm in air and about 500 nm in polycarbonate. The light diffusion index is 1.55. In the specification for the birefringence of polycarbonate substrates is stated that this may vary by a maximum of 20% from the given value and may thus amount to a maximum of 100 nm. A larger variation will certainly result in problems. It is remarked here that in the case of production processes for mass-produced articles such as those under consideration, it must be ensured under all circumstances that the relevant norm is achieved, even in the most unfavourable conditions. It is therefore desirable to design a mould such that the birefringence is thus as low as possible in all conditions and is nominally considerably lower than the stated tolerance limits.

The birefringence is measured in terms of phase differences and decrease in light intensity between a $\chi$-component and the $\gamma$-component of polarized light. The birefringence is expressed in nanometres (nm).

A further explanation concerning the described concepts can be found in "Kunststoffe German Platics" 1989/1, reprint, "Birefringence in Optical Information Storage Discs made of Polycarbonate".

For manufacture of information carriers of the described type an optionally replaceable wall of the mould cavity is provided with a negative impression of information to be arranged on the disc-like object. Such information must be transferred with very great reliability and accuracy onto the disc-like object.

It is further necessary to prevent the occurrence of a phenomenon known as "dishing". This is the phenomenon where a disc-like object is not flat but has a shape which curves in substantially rotation symmetrical manner. In this same context the phenomenon of "warpage" often occurs, wherein the disc-like object acquires a saddle shape. It may even occur that a disc-like object produces so-called "click-clack". This is the phenomenon where an object has two mutually differing stable shapes which can transpose into each other by exerting a force on the central zone.

It is an object of the invention to essentially prevent to a considerable extent the described undesired phenomena and generally improve the quality of a disc-like object.

It a further object of the invention to embody a mould of the described type such that the time required to manufacture a disc-like object is reduced.

Summarizing very briefly the objectives of the invention as specified above, a main purpose of the invention is to improve the quality of a manufactured disc-like object while reducing the cycle time.

With a view to these objectives the invention aims to considerably increase the "operating window". This operating window is understood to mean the total range in which combinations of parameter values are possible wherein the set requirements can be fulfilled.

SUMMARY OF THE INVENTION

The invention provides a mould which has the feature that at least one of the two mould parts is provided with first tempering means which are active substantially only in the middle zone of the mould cavity for tempering the inflowing plastic during the inflow thereof via the pressure line and thus the filling of the mould cavity.

It is noted that an injection mould is known, of which the so-called mirrors, i.e. the substantially plane walls of the mould cavity, the so-called punch and the injection conduit or injection bush are provided with cooling means. However, such cooling means have not been found effective in realizing the above stated objectives of the invention.

In a specific embodiment this mould has the feature that the ratio of the diameters of the middle zone and of the mould cavity lies in the range of (0.30±0.15).

It should be appreciated that the plasticized plastic flowing in via the central zone is subjected at that position to a temperature change. At the location of this central zone there is a flow in substantially radial direction in order to fill the mould cavity. By cooling the inflowing plastic in this zone by means of the first tempering means a certain "freezing" of the relevant material takes place, whereby the effective passage of the material is limited. This passage therefore varies during the injection of plasticized plastic. The smaller the passage becomes, the higher the pressure required to keep constant the flow rate of the inflowing plastic. If the pressure were to be kept the same, the flow rate of the inflowing plastic would then decrease. It will be apparent that it is possible to experiment with the given parameters until the quality of an obtained disc-like object is as high as possible, or at least lies within for instance a required norm.

In a further embodiment the mould has the feature that at least one of the two mould parts is provided with second tempering means which are active substantially only in the peripheral zone of the mould cavity for tempering the inflowing plastic during the inflow thereof via the injection conduit and thus the filling of the mould cavity.

This variant is particular can have the special feature that the second tempering means co-act directly with the peripheral wall surface of the mould cavity.

As will be described hereinbelow, the second tempering means can be arranged in a moving, so-called venting ring. The advantage of this second tempering means is that the index of refraction can hereby be influenced in terms of the birefringence of a transparent information carrier. The birefringence displays a sharp rise on the outside of the disc-like information carrier and, as will be described hereinbelow, reaches a critical limit of about ±50 mm. By embodying the second tempering means such that the relevant peripheral zone has a higher temperature than the substantially plane end walls of the mould cavity, the cooling flow front of the injected plastic in the mould cavity will contact the relatively hot wall parts of the peripheral zone and thereby obtain a different build-up of stress than in the case where this plastic comes into contact there with a relatively cold peripheral zone.

The said internal build-up of stress has immediate consequences for the optical qualities of the obtained transparent information carrier. As is generally known, a high internal stress corresponds to a high birefringence.

A further variant has the feature that an additional mould part is arranged round the mould part through which said injection conduit extends, which additional mould part is provided with third tempering means which are active substantially only in the region of the relevant end wall of the mould cavity round the injection conduit for tempering the plastic flowing into the mould cavity during the filling of the mould cavity.

Said additional mould part is cooled by means of the third tempering means and thus forms a buffer between the cold injection conduit and the relatively hot adjacent plane wall of the mould cavity.

It is noted that the mould part in question, depending on the embodiment of the mould, can act either for instance as punch or as positioning means.

A specific embodiment is provided with mechanical positioning means for fixedly holding, by engaging on the end zone of a central hole, at least one disc-like insert bearing the negative impression of information to be arranged on the disc-like object, which positioning means are provided with fourth tempering means which are active in the region of the said engagement. The described positioning means comprise a central hub which has an annular hook which extends into the mould cavity and is dimensioned such that it can be placed in engaging co-action with the peripheral zone of a central hole in the disc-like insert.

A practical embodiment of the mould according to the invention has the special feature that the tempering means comprise channels for heat transport medium arranged in the mould parts. It is noted in this respect that other embodiments of the tempering means are also possible, for instance electric heating and/or cooling means. Electric heating means can comprise resistance elements, while cooling means can for instance comprise Peltier elements.

A very inexpensive and effective embodiment has the special feature that the heat transport medium is water.

It is noted generally that the relevant surfaces of the mould cavity, at least in the region of the tempering means, consist of a thermally conductive material, for instance steel, bronze or other alloy. What is important is that the tempering means can make thermal contact via the relevant wall surfaces with the plasticized plastic during forming of an object.

There are diverse technical possibilities for the manufacture of the channels forming part of the tempering means. A simple embodiment has the special feature that the channels are at least partially formed by embodying a relevant mould part, divided by the main plane of a channel, in two sub-parts, at least one of which sub-parts is provided with a groove corresponding with the channel and is covered with the other sub-part.

In order to impart the most effective possible action to the tempering means, the embodiment is recommended in which the active surfaces in the region of the tempering means comprise an alloy with high thermal conduction coefficient, for instance beryllium copper or Ampco.

Yet another variant has the special feature that the active surfaces in the region of the tempering means are provided with a hard coating, for instance of chromium, titanium nitride or the like.

As specified above, the mould according to the invention can serve to manufacture transparent information carriers such as CDs, VLPs, DVDs and the like. It is often deemed impractical to arrange the negative impression of the information to be arranged on the information carrier directly onto a surface of the mould cavity. Generally known per se is the use of a disc-like insert or "stamper" on which the relevant negative information is arranged. Such an insert must be replaced after a certain time has elapsed, for instance after a number of production cycles or in order to manufacture a different type of information carrier.

In respect of the above the invention also provides a mould which is characterized by positioning means for positioning and holding at least one disc-like insert bearing a negative impression of information to be arranged on the disc-like object, which positioning means comprise an at least partly cylindrical bush of thermally conductive material, for instance steel, bronze or other alloy, wherein the first tempering means also co-act with the positioning means. Said positioning means are per se known. A disc-like insert, which is often made of nickel, is for instance held fast by a hook-like element which engages the relevant insert on the peripheral zone of a central hole present herein. The positioning means can serve for exact positioning as well as for releasable holding of said insert, which is generally designated a "stamper". This embodiment is of mechanical character. The positioning function can also be separated from the holding function. Exact positioning of the insert is possible by means of a protruding edge which co-acts with a central hole in the insert, while holding can take place by making use of magnetic forces, underpressure or other suitable means.

It is noted that moulds of various types exist. In one particular type the stamper is held in position by mechanical means, magnetic means, underpressure or other suitable means against a wall of the mould cavity located opposite the outflow opening of the injection conduit. In another embodiment the stamper is held on the wall in which the injection conduit debouches. The invention has the same advantages for these different embodiments.

As already described above, the additional mould part, depending on its function, can serve as punch or as positioning means.

The mould according to the invention can have the further feature that the tempering means are adapted to hold the relevant active surfaces at a specific chosen temperature. Attention is drawn in this respect to the fact that the desired temperature can greatly depend on the location where the relevant tempering means are active. The desired temperature also depends on the cycle time.

By way of orientation and without limiting the scope of protection of this specification, the following temperatures can be stated for audio CDs:

injection bush, punch: about 10° C.–30° C.

mirrors (plane surfaces of the mould cavity): about 40° C.–70° C.

peripheral zone: about 50° C.–100° C. The respective tempering means herefor specified in the claims can, subject to the wish to adjust specific temperatures, be adjustable either in combination or indeed individually.

As stated above, cooling of punch, injection bush and mirrors is already known. This invention does not therefore relate to these aspects.

BRIEF DESCRIPTION OF THE DRAWINGS

The invention will now be elucidated with reference to the annexed drawings. Herein.

DETAILED DESCRIPTION OF THE INVENTION

Figure 1:
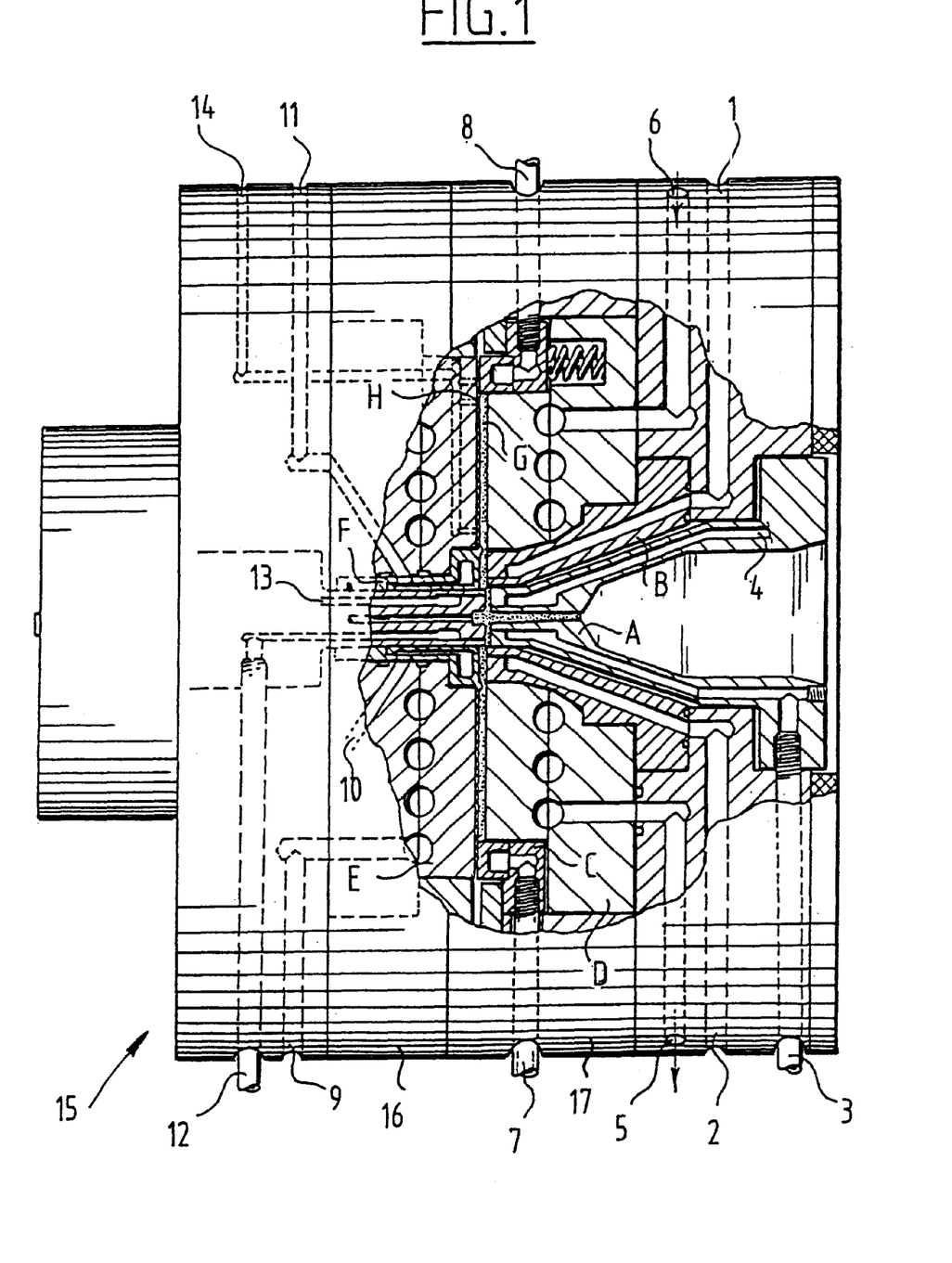
FIG. 1 shows a side view broken away partly to a longitudinal section of a random embodiment of a mould according to the invention, wherein it is noted that the first tempering means in this injection mould comprise the punch, the stamper and the stamper holder and centre hub, while the second tempering means comprise the venting ring.
Figure 2:
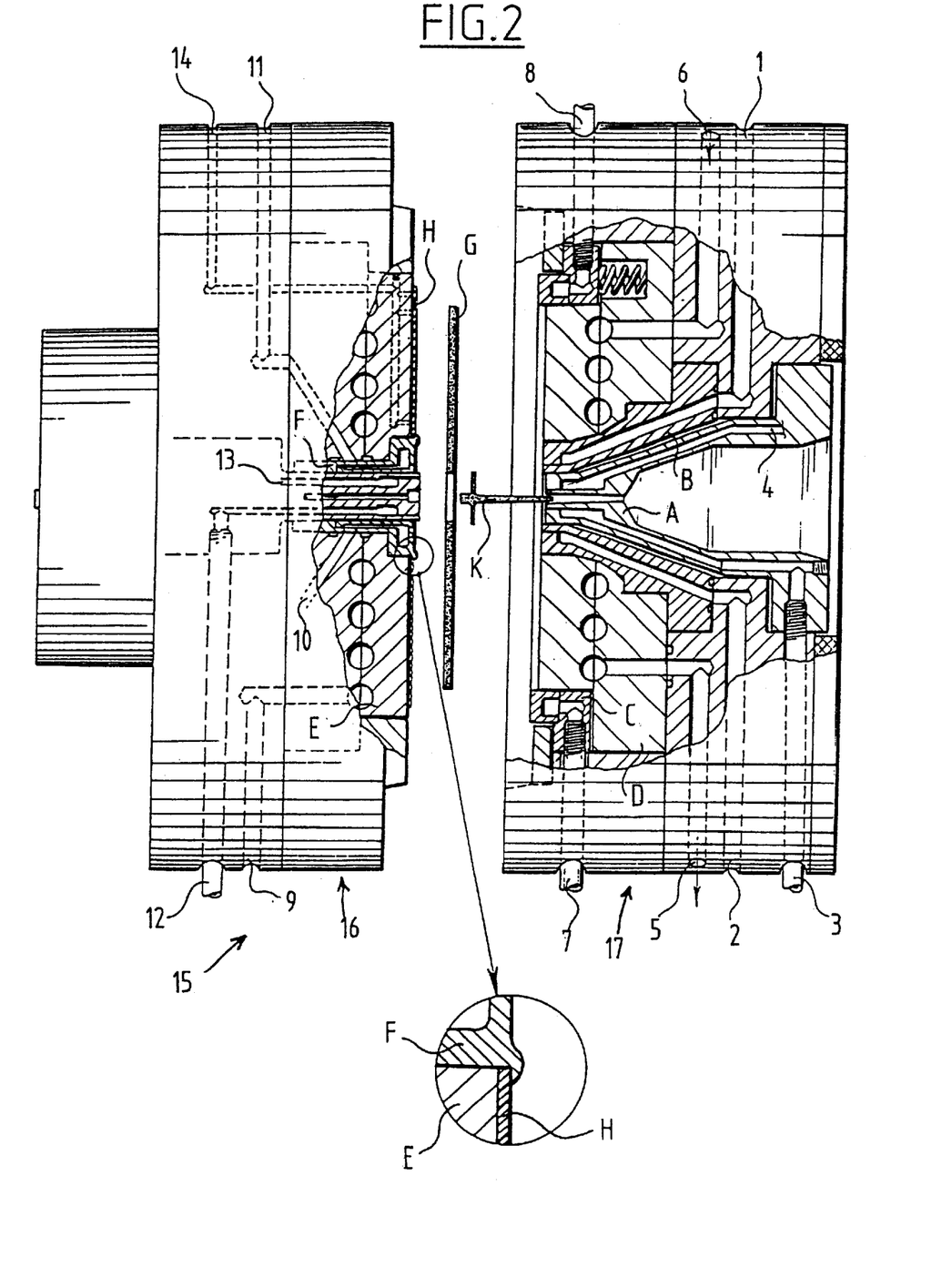
FIG. 2 shows a view corresponding with FIG. 1 of the mould of FIG. 1 in opened position.

FIGS. 1 and 2 show a mould 15 comprising two mould parts 16, 17.

The components are designated with reference letters and reference numerals in accordance with the list below.

A injection bush through which extends an injection conduit;

B punch;

C venting ring;

D front mirror;

E rear mirror;

F central hub;

G compact disc manufactured by injection moulding and removed from the mould cavity;

H stamper;

K sprue (this is a removable part consisting of a cured plastic rod from the injection conduit, a disc-shaped portion connecting thereto and corresponding with the central hole in the compact disc, and a short widened portion with which sprue K is temporarily held in a cavity with undercut form).

1 inlet cooling channel punch;

2 outlet cooling channel punch;

3 inlet cooling channel injection bush;

4 outlet cooling channel injection bush;

5 outlet cooling channel front mirror;

6 inlet cooling channel front mirror;

7 inlet cooling channel venting ring;

8 outlet cooling channel venting ring;

9 cooling rear mirror;

10 inlet cooling channel central hub;

11 outlet cooling channel central hub;

12 inlet cooling channel punch;

13 outlet cooling channel punch;

14 suction line for holding stamper H via grooves;

15 mould;

16 first mould part;

17 second mould part.

As the enlarged detail in FIG. 2 shows, the central hub F comprises an annular hook with which stamper H is held. The central hook has an annular elevation which is ultimately delineated on the relevant zone of compact disc G.

As illustrated in FIG. 1 and FIG. 2, the first tempering means (middle zone tempering means); the second tempering means (peripheral zone tempering means); the third tempering means (wall region tempering means); and the fourth tempering means (end zone tempering means) are each associated with channels internal to the mould arranged around the injection conduit.

A gap 20 may extend between the middle zone tempering means and the wall region tempering means.

Figure 3:
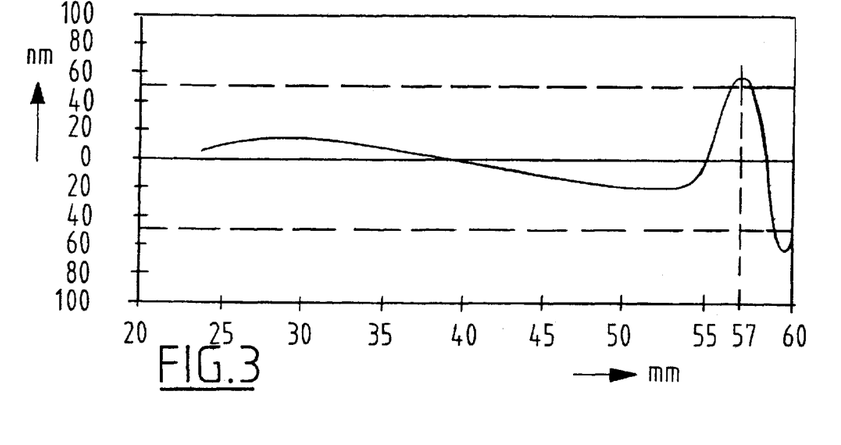
FIG. 3 shows a graph of the typical relation between the birefringence and the radial position in the case of a disc-like information carrier with a radius of 60 mm which is manufactured by making use of a known injection mould with cooled punch, cooled injection bush and cooled mirrors.

FIG. 3 shows the birefringence as a function of the radial position for a CD which is manufactured with a known mould provided with a cooled punch, a cooled injection bush and cooled mirrors. A recommended norm of ±50 nm is indicated with broken lines. The curve lies outside the given toleration limits particularly at about 57 and around 59 nm. It is further noticeable that in the range of about 30 mm–50 mm the curve displays a fall in the amount of about 40 nm.

Figure 4:
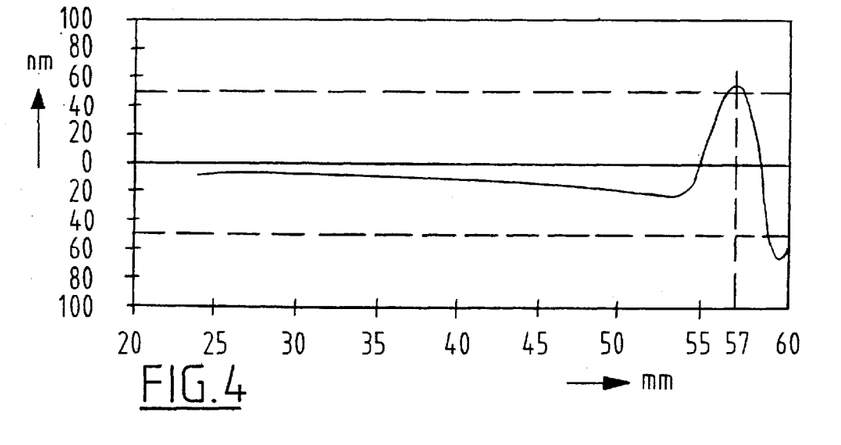
FIG. 4 shows a graph corresponding with FIG. 3 of the typical relation between the birefringence and the radial position in the case of a disc-like information carrier with a radius of 60 mm and an injection mould with cooling in the middle zone of the mould cavity.

As shown in FIG. 4, the cooling by the first tempering means in the middle zone of the mould cavity causes a flatter progression of the curve. The total fall in the range of about 25–57 mm amounts to no more than about 15 nm.

Due to the cooling in the peripheral zone, i.e. the venting ring C which forms the peripheral boundary of the mould, the maximum value of the birefringence will be reduced. The peak of the curse is also shifted outward close to the maximum radius of the information carrier. This is shown clearly in FIG. 5. In the range between about 25 and 57 mm the curve of FIG. 5 generally shows a variation in the birefringence of no more than about 15 nm, while in the critical range 57–60 mm the curve also remains within the set toleration limits.

Due to the cooling in the middle zone of the mould cavity the radial warpage decreases. The warpage can be compared with the general shape of a coolie hat. Due to the cooling of the peripheral zone the tangential warpage decreases. This corresponds with the general shape of a cowboy hat.

Due to the cooling in the middle zone of the mould cavity a better replication of the pits is ensured, whereby a higher quality of the so-called electrical signals is obtained. These are the signals which co-determine the signal format stored in a digital information carrier, such as I3, I11, Push pull, Block Error rate, jitter and so on. Due to the cooling in the peripheral zone of the mould cavity a smaller signal loss occurs from an inner-lying radial position (r=25 mm) to an outer-lying radial position (r=60 mm). Said signals are thereby improved particularly at the position of the outer edge. This is of particularly great importance in the case of a long playing time, for instance 70 minutes or more.

Due to the improved cooling which results in an improvement in the birefringence and an improvement of the signals, the mould temperature can generally be reduced, which results in a shorter cycle time. Cycle time is understood to mean the total time duration required to manufacture one disc-like object with the mould according to the invention.

With this shorter cycle time the signals and the birefringence are then within the so-called "Red-Book" specification.

Figure 5:
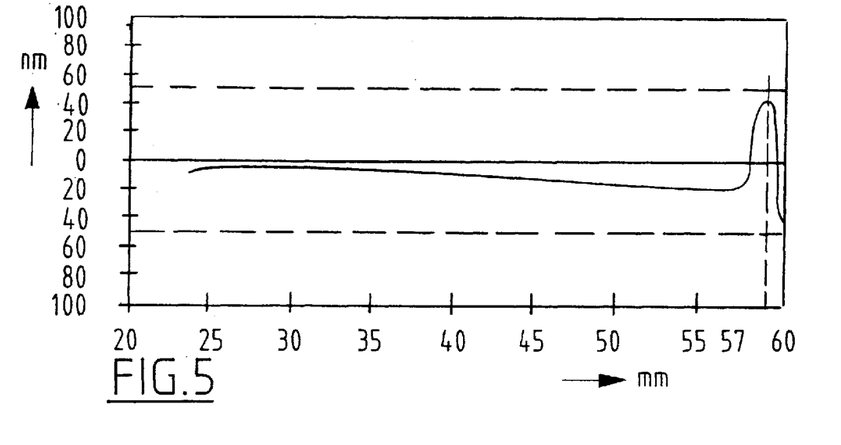
FIG. 5 shows a graph corresponding with FIG. 3 of the typical relation between the birefringence and the radial position in the case of a disc-like information carrier with a radius of 60 mm and an injection mould with cooling in the middle zone of the mould cavity and cooling in the peripheral zone of the mould cavity.
Figure 6:
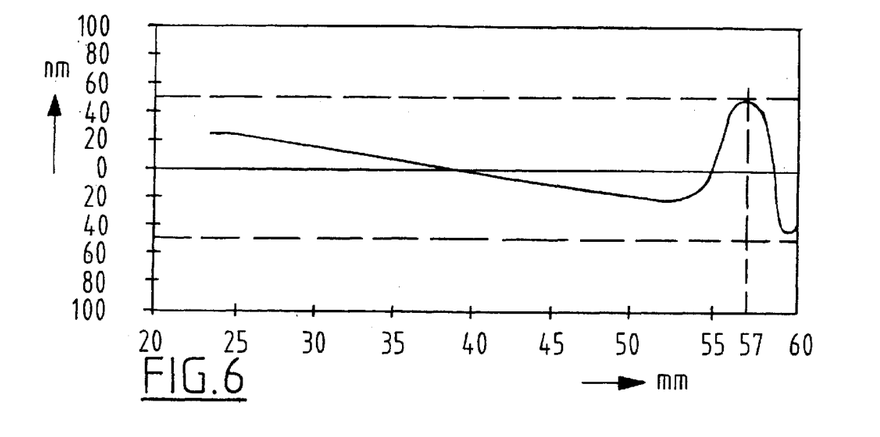
FIGS. 6, 7 and 8 show graphs corresponding respectively with FIGS. 3, 4 and 5 for an injection pressing process.
Figure 7:
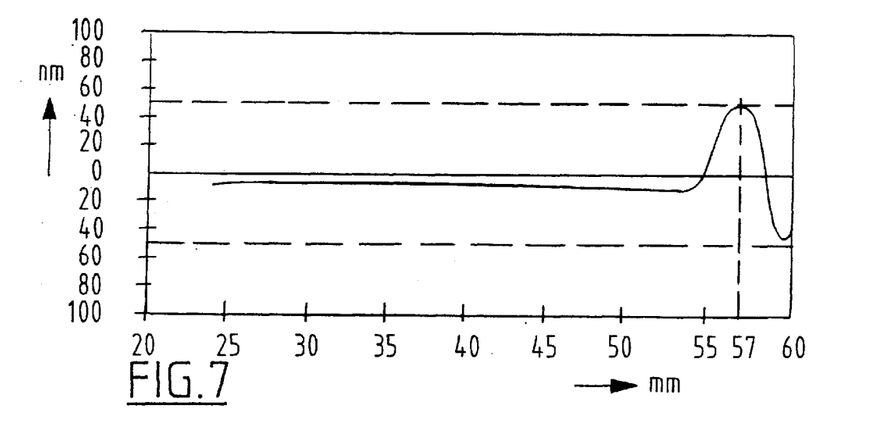
Figure 8:
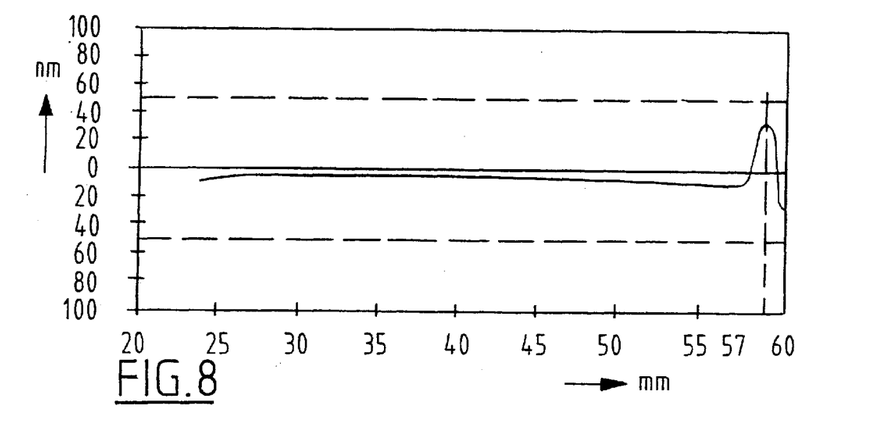

FIGS. 6, 7 and 8 show typical curves of the birefringence for the injection pressing process for comparison with the injection moulding process according to FIGS. 3, 4 and 5.

FIG. 6 shows a typical curve without additional tempering, FIG. 7 the curve where use is made of central tempering, and FIG. 8 a curve with both central tempering and peripheral tempering.

It is noticeable that the curve of FIG. 6 progresses within narrower limits than that of FIG. 3. The fall in the range 23–52 mm is however relatively steep and amounts to almost 50 nm.

By making use of the central tempering according to FIG. 7 the curve in the range 23–53 mm becomes practically flat within several nm, which already involves a substantial improvement. However, the peak at 57 mm and the dip at about 59 mm remain unchanged.

By making use of both central cooling and peripheral cooling the curve of FIG. 8 is realized. This is substantially flat in the range 23–57 mm, whereafter a peak follows at the value 59 mm. This peak is however considerably less pronounced than in FIG. 7.

What is claimed is:

1. A mould for manufacturing discs, which mould comprises:
    at least two mould parts which are mutually movable between a closed position in which they bound a mould cavity, which mould cavity has walls, a middle zone and a peripheral zone and which mould cavity is connected to an injection conduit for admitting heated, plasticized plastic under pressure into said mould cavity, and an opened position in which a disc can be removed;
    removing means for removing a central portion from the disc to form a central hole present therein, which removing means comprise a cylindrical part which is movable in an axial direction in the closed situation of the mould cavity,
    wherein at least one of the two mould parts is provided with middle zone tempering means which surround the injection conduit and are active in the middle zone of the mould cavity for tempering the inflowing plastic during the inflow thereof via a pressure line and thus during the filling of the mould cavity, and
    an additional mould part arranged around the mould part through which said injection conduit extends, which additional mould part is provided with a wall region tempering means which completely surround said middle zone tempering means in the region adjacent to the mould cavity and which are active only in the region of the wall of the mould cavity around the injection conduit for tempering the plastic flowing into the mould cavity during the filling of the mould cavity.

2. The mould as claimed in claim 1,
    wherein
        the ratio of the diameters of the middle zone and of the mould cavity lies in the range of 0.45–0.15.

3. The mould as claimed in claim 1, wherein at least one of the two mould parts is provided with peripheral zone tempering means which are active in the peripheral zone of the mould cavity for tempering the inflowing plastic during the inflow thereof via the injection conduit and thus during the filling of the mould cavity.

4. The mould as claimed in claim 3, wherein the peripheral zone tempering means co-act directly with the peripheral wall surface of the mould cavity.

5. The mould as claimed in claim 1, further comprising mechanical positioning means for fixedly holding, by engaging on the end zone of a central hole, at least one disc-shaped insert bearing the negative impression of information to be arranged on the disc, which positioning means are provided with an end zone tempering means which are active in the region of said engagement.

6. The mould as claimed in claim 1, wherein the middle zone tempering means comprise channels for heat transport medium arranged in the mould parts.

7. The mould as claimed in claim 6,
    wherein
        the heat transport medium is water.

8. The mould as claimed in claim 6,
    wherein
        the channels are at least partially formed by embodying a relevant mould part, divided by the main plane of a channel, in two sub-parts, at least one of which sub-parts is provided with a groove corresponding with the channel and is covered with the other sub-part.

9. The mould as claimed in claim 1,
    wherein
        the active surfaces in the region of the tempering means comprise an alloy with high thermal conduction coefficient.

10. The mould as claimed in claim 1,
    wherein
        the active surfaces in the region of the tempering means are provided with a hard coating.

11. The mould as claimed in claim 1, further comprising positioning means for positioning at least one disc-shaped insert bearing a negative impression of information to be arranged on the disc, which positioning means comprise an at least partly cylindrical bush of thermally conductive material, wherein the middle zone tempering means also co-act with the positioning means.

12. The mould as claimed in claim 1, wherein each of the tempering means are adapted to hold the relevant active surfaces at a specific chosen temperature.

13. The mould as claimed in claim 10, wherein the hard coating is chrome.

14. The mould as claimed in claim 10, wherein the hard coating is titanium nitride.

15. The mould as claimed in claim 11, wherein the thermally conductive material is steel.

16. The mould as claimed in claim 11, wherein the thermally conductive material is an alloy.

17. The mould as claimed in claim 16, wherein the alloy is bronze.

18. The mould as claimed in claim 9, wherein the alloy is beryllium copper.

19. The mould as claimed in claim 9, wherein the alloy is a copper alloy.

20. The mould as claimed in claim 1 further including a gap surrounding said middle zone tempering means and separating said wall region tempering means from said middle zone tempering means.

* * * * *

UNITED STATES PATENT AND TRADEMARK OFFICE
CERTIFICATE OF CORRECTION

PATENT NO. : 6,322,350 B1
DATED : November 27, 2001
INVENTOR(S) : Martinus Henricus Joseph Voets et al.

It is certified that error appears in the above-identified patent and that said Letters Patent is hereby corrected as shown below:

Title page,
Item [56], References Cited, OTHER PUBLICATIONS,
Second reference, Applicant "Hotachi" should read -- Hitachi --.
Third line of third reference on page 2, column 1: "Publication No. 04019760" should read -- Publication No. 04018760 --.

Column 1,
Line 67, "Platics" should read -- Plastics --.

Column 3,
Line 7, "is particular" should read -- in particular --.
Line 16, "mm" should read -- nm --.

Column 6,
Line 59, "The peak of the curse" should read -- The peak of the curve --.

Signed and Sealed this

Eleventh Day of June, 2002

Attest:

JAMES E. ROGAN
Attesting Officer    Director of the United States Patent and Trademark Office